United States Patent [19]
Cox

[11] 4,450,643
[45] May 29, 1984

[54] FISHING NET

[76] Inventor: Theodore W. Cox, 1648 Mussula Rd., Towson, Md. 21204

[21] Appl. No.: 448,702

[22] Filed: Dec. 10, 1982

[51] Int. Cl.³ ............................................. A01K 77/00
[52] U.S. Cl. ............................................................. 43/12
[58] Field of Search ................................. 43/10, 11, 12

[56] References Cited

U.S. PATENT DOCUMENTS 2,984,038  5/1961  Chapralis ............................ 43/12

Primary Examiner—Nicholas P. Godici
Assistant Examiner—M. Jordan
Attorney, Agent, or Firm—John F. McClellan, Sr.

[57] ABSTRACT

An improved landing net of the type having a handle supporting a frame having an opening at the end of the frame away from the handle and a "U"-shaped member pivotally secured by the ends of the "U"-shaped member to the frame at the opening for providing a slotted support for a net secured to the frame and "U"-shaped member, provides a position lock for one or both pivoted ends of the "U"-shaped member, converting it from a floppy, still-water landing net to a versatile landing net usable in high current flow situations for netting large fish head-first with fishing boat underway, for example, or for netting tail-first, if desired, and without sacrifice of folding compactly to a carriage position, from which position the invention is instantly deployable by a snap of the wrists.

6 Claims, 4 Drawing Figures

U.S. Patent    May 29, 1984    4,450,643
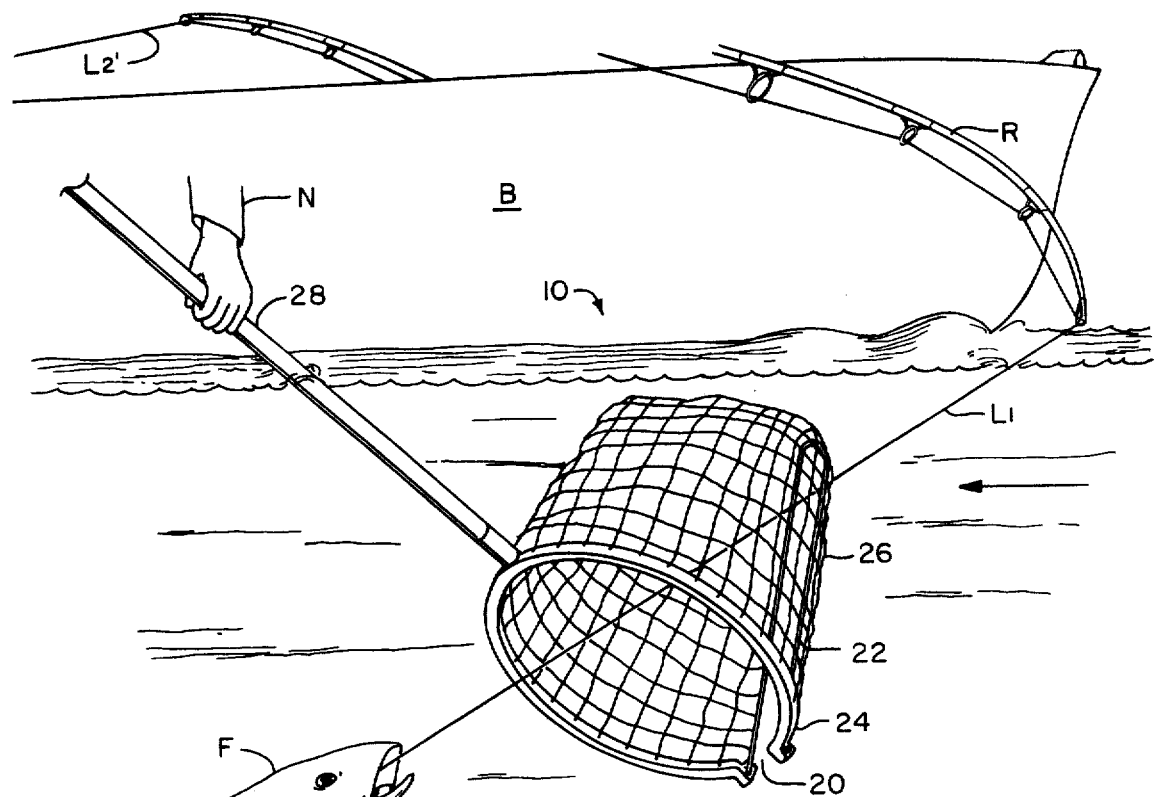
FIG. 1
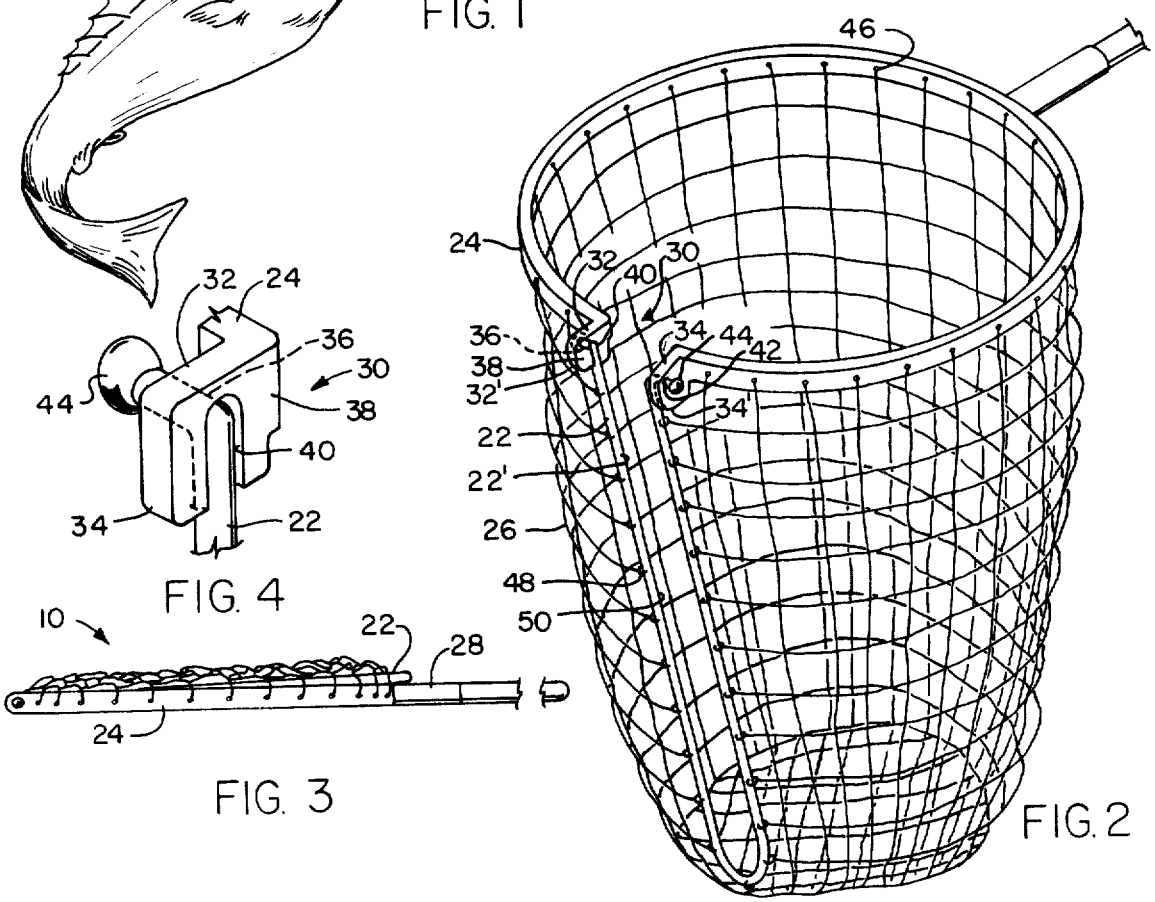
FIG. 4
FIG. 3
FIG. 2

FISHING NET

This invention relates generally to fishing nets and particularly to an improved fish landing system of the handle-equipped split-frame type.

BACKGROUND OF THE INVENTION

Particularly where fishing from a boat for sizeable fish, such as fishing in the Chesapeake Bay for rockfish and large bluefish, anglers lose a substantial percentage of fish in boating them, because of inefficient and awkward netting of the fish.

Conventional nets lack versatility in that they often knock the hook out of the fish's mouth when an attempt is made to net a fish head-first. Head-first netting of a fish may be the only approach in situations in which the fish is boat-shy, or is over-long for the net and still full of fight. When headway is maintained on the boat, as it usually is when several parties are trolling, head-first netting may be the only practical method because of the physical exertion and space necessary to advance the net from behind the fish.

The following U.S. patents appear to be especially directed to handle-equipped apparatus for head-first landing of fish:

U.S. Pat. No. 2,921,397 issued to A. Luthi on 1-19-60 disclosed a somewhat complex and unconventional system with a zipper for admitting the line into the net to permit head-first landing of the fish;

U.S. Pat. No. 1,580,543 issued to R. J. Smith on 4-13-26 is believed to be closest to the present invention, which is directed to improvement over it.

The Smith patent discloses essentially a still water or free-closing landing net with "wire" frame supported by a handle, and having an opening in the frame at the end of the frame opposite the handle end, with a "U"-shaped wire member freely swivelled at the ends to respective ends of the frame at the opening. The open top netting attaches conventionally around the frame but at the opening follows the "U"-shaped member, communicating with the full opening at the frame. In still water the Smith apparatus can, with care, be laid over the line so that the slot receives the line, and passed down the line to the fish, which is then to be netted head first.

However, the free-swivelling of the "U"-shaped member can result in impositive operation. It will be evident that with headway on the boat, or in any substantial current relative to the fisherman, the passage of the water can slow the net and "U"-shaped member in such manner as effectively to close the net. For example, when the boat has headway with the fish in tow and the Smith apparatus is lowered ahead of the fish, gravity and/or current can swing the "U"-shaped member and net closed, in which condition they pass down the line against the head of the fish, the very thing to be avoided. Similarly, when the fish is to be netted tail first, the current, or relative current, can swing the net and "U"-shaped member back towards the handle into closed configuration, again defeating the purpose of the net.

OBJECTS OF THE INVENTION

In the fifty-six years since issuance of the Smith split-frame patent, that type-mechanism has failed to become a standard article of commerce for the purpose. A principal object of the invention is to provide an improvement which will make the split frame landing net the standard of commerce for line fishing landing or dip-type nets.

Further objects are to provide an improvement in a net system as described: which is all-purpose in that it provides a current and gravity resistant positive-adjustment maintaining the pocket, preventing unwanted folding by currents, and fitting it for both headfirst and tailfirst netting through overcoming limitations in the known apparatus of Smith;

which folds easily for storage but can be snapped open to the stable use position by a quick manipulation of the handle;

which has a positive but easily released detent for locking it in the stable use-configuration and which can have a double lock, releasible in either case with a single squeeze;

which maintains a pocket that can shield fish from the current during head-first landing on a boat underway or in a stream and cause the fish to enter the net earlier and easier;

which is durable, resists twisting, jam-resistant and won't tangle with the line;

which can be used sideways and with long handles, in large and in small sizes, and which is lightweight and convenient to use.

BRIEF DESCRIPTION OF THE DRAWINGS

The above and other objects and advantages of this invention will become more readily apparent on examination of the following description, including the drawings in which like reference numerals refer to like parts.

FIG. 1 is a perspective view of the invention in use;
FIG. 2 is a perspective detail;
FIG. 3 is an elevational view; and
FIG. 4 is an enlarged fragmentary perspective detail.

DETAILED DESCRIPTION

FIG. 1 shows the invention 10 being passed along a line $L_1$ to net a fish F. Both the fisherman with the rod R and the netter N are aboard a boat B which is depicted as underway for the benefit of other lines aboard ($L_2$ shown), which may be trolling. The relative current (arrow) may leave little choice but to take the fish headfirst into the net regardless of how boat-shy the fish happens to be. With a conventional landing net the possibility of knocking the line free of the fish would be considerably more than with this invention, which provides a slot 20 for the line, somewhat like the Smith patent device described above. Most importantly however, this invention locks the net in open, deployed, position by locking the "U"-shaped member 22 at an angle (nearly perpendicular but preferably swept-back at 15 degrees or so (a funnel angle) holding the net open, with the slot communicating with the open top of the net at the frame 24.

The handle 28 of the net may be an aluminum tube for lightness, with the frame 24 conventionally having a loop (or simply ends of frame halves) passing into the tube and wedged in by driven wooden dowels. The frame may be of any suitable material such as aluminum, or a rigid, tough thermoplastic.

FIG. 2 shows the instant-deployment or snap-lock means 30 for locking the "U"-shaped member 22 in an open position relative to the frame 24. The "U"-shaped member has generally parallel sides and a rounded bottom which exerts a spring force tending to separate the ends.

The frame, which may be of ½ inch (13 mm) by 1 inch (2.5 cm) sectional dimension for a 24-inch (60 cm) diameter, may have an out-turned ear 32, 34 on each respective end, with a hole 36 through the ear and on the inner face 38 of the ear structure defining a recess (40 shown) communicating with the hole and passing through the lower edge of the ear. Each outturned ear may have welded to it at the bottom a reinforcing vertical extension 32′, 34′ of perhaps ½ inch (13 mm) with the whole being rounded. Each end of the "U"-shaped member is turned out at approximately a 90° angle and passes outward through a respective one of the holes in an ear. This permits a respective portion of the "U"-shaped member adjacent the turned-out end 42 to fall into the forcibly engage a recess 40, detachably fixing or locking the "U"-shaped member in place under the spring force of the "U"-shaped member.

Means for unloading the landing net for folding comprise parts of the "U"-shaped member along the respective sides which are so-positioned that when squeezed together (at about 22′), they slide the turned-out ends in the holes and remove the portions from the recesses 40. End retainers 44 which may be spheres to prevent line hangups on them, prevent the ends 42 of the "U"-shaped member from sliding past the free-play length provided. They may be flush-pinned on or soldered or screwed on so long as the ready line-releasing feature of the spherical shape is preserved. These means for preventing line snagging, or coaxially mounted metallic or plastic spherical shapes, may be about ½ inch to ¾ inch. (13 mm to 18 mm) in diameter.

The "U"-shaped member 22 may be an aluminum rod ⅜ (9 mm) in diameter). The length of the "U" may be about 25 inches (68 cm) so that it will not swing through the frame in folding. The netting 26 is preferably taut enough when deployed to prevent over-deployment (overswing of the "U"-shaped member). Slot width may be 13/32 (10 mm), and the slots may incline downwardly toward the rear at the 15 degree angle noted. If desired, only one slot need be used, but to have one on each side is preferred.

The netting 26 may be conventionally affixed to the frame by means of holes 46 and to the "U"-shaped member by means of rings 48 on the outside of the "U"-shaped member, leaving the throat 50 smooth for preventing fishing line abrasion.

FIG. 3 shows the invention 10 in edge view inverted for carrying in the folded position. To deploy the "U"-shaped member 22 and lock it in position only requires a quick impulse or shake of the handle or at most, inverting the frame 24 and then shaking it. The handle 28 may be of an length and may telescope for convenience carrying.

FIG. 4 is an enlarged detail showing the snap-lock means 30 for locking the "U"-shaped member 22 relative to the frame 24. The out-turned ear 32 is shown with hole 36 through it and recess or groove 40 communicating with the hole on the inner face 38 of the ear structure. 34 is the vertical extension.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system of landing net including a handle supporting a frame which holds an open-top netting and has an opening at the end of the frame away from the handle, and a "U"-shaped member with ends pivotally connected respectively to the frame at respective sides of the opening for supporting the net so that the net has a deployed position with a slot therein communicating with the open top, and has a folded position, the improvement comprising: means for adapting the system for use in a current in netting a fish head-first, including means for locking said U-shaped member to said frame in deployed position; and means for unlocking said U-shaped member from said frame for folding and storage.

2. In a system as recited in claim 1, said means for locking being means for locking under impulse of a quick movement of the handle.

3. In a system as recited in claim 1, said means for locking including said frame at each of said sides of the opening having a hole therein, said pivotally connected ends of the "U"-shaped member being out-turned ends, each out-turned end engaging a respective said hole, and the frame having recess structure at least at one of said sides proportioned for receiving a portion of said "U"-shaped member adjacent a said out-turned end, and said "U"-shaped member exerting a spring force urging it into said recess structure in deployed position.

4. In a system as recited in claim 3, said frame at each of said sides having said structure proportioned for detachably fixing in place a portion of said "U"-shaped member.

5. In a system as recited in claim 1, said deployed position including said "U"-shaped member proportioned for forcibly engaging a recess in said deployed position, and the means for unlocking the landing net from said deployed position including respective parts of said "U"-shaped member positioned for releasing said forcible engagement when squeezed together.

6. In a system as recited in claim 3, each out-turned end terminating in a means preventing line snagging, each means for preventing line snagging being a spherical shape.

* * * * *